June 3, 1952 J. BOLSEY 2,598,753
TRIPOD
Original Filed Sept. 24, 1947
FIG.1.
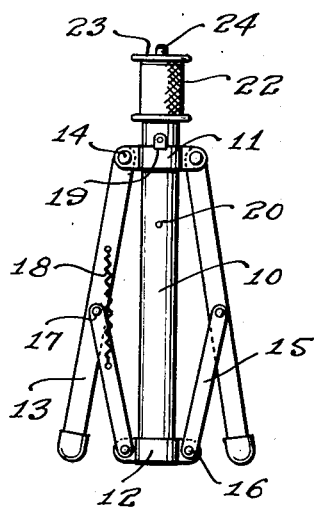
FIG.2.
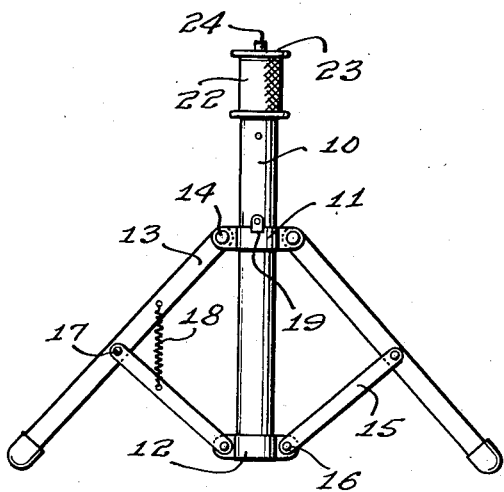
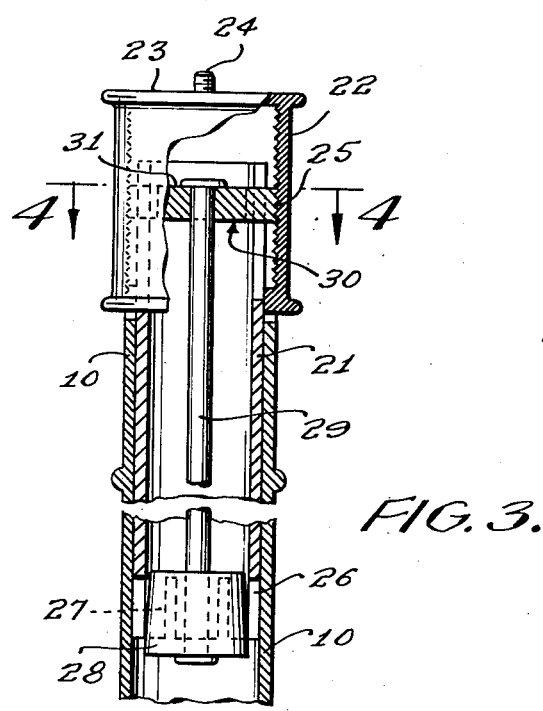
FIG.3.
FIG.4.
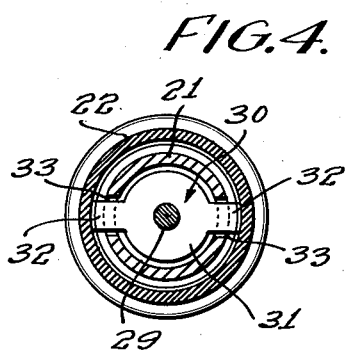
INVENTOR.
Jacques Bolsey
BY
Michael S. Striker Patented June 3, 1952

2,598,753

UNITED STATES PATENT OFFICE 2,598,753

TRIPOD

Jacques Bolsey, New York, N. Y.

Original application September 24, 1947, Serial No. 775,798. Divided and this application February 1, 1950, Serial No. 141,708

4 Claims. (Cl. 248—171)

1

This application is a division of my U. S. patent application Serial No. 775,798, filed September 24, 1947, entitled "Adjusting Means for Cameras," now abandoned, which latter application is a continuation-in-part of my U. S. patent application Serial No. 542,031, filed June 24, 1944, entitled "Photographic Cameras," now abandoned.

My present invention relates to tripods.

It is an object of my present invention to provide a tripod which has legs arranged so as to be adapted to be turned easily and fast into supporting position.

It is another object of my present invention to provide means by which the tripod head can be moved in an easy manner relative to the tripod and held in any desired position.

An embodiment of my new tripod comprises in combination a central post, means for securing a camera to the top of this central post, a sleeve member enclosing the central post slidably along the same, a plurality of tripod legs each pivotally secured to the sleeve member, a plurality of elongated guiding members each pivoted at one end to one of the tripod legs spaced from the end thereof and pivoted at its other end to the bottom portion of the central post so as to be adapted to guide the legs between closed position with the sleeve member in uppermost position and the legs substantially parallel and adjacent to the central post and supporting position with the sleeve member moved toward the bottom portion of the central post and the legs in outwardly turned supporting position, manually operable locking means for locking the legs in closed position, whenever desired, manually releasable locking means for locking the legs in outwardly turned supporting position, and spring means permanently tending to move the legs from closed into supporting position.

And another embodiment of my new tripod comprises in combination a tubular central post, legs for supporting the tubular central post in upright position, a tubular extension post having an outer diameter being slightly smaller than the diameter of the tubular central post and arranged slidably within the tubular central post projecting upward beyond the upper end thereof, a plurality of expansion tongues formed at the lower end of the tubular extension post, a conical expansion member arranged within the tubular extension post at the lower end thereof engaging the expansion tongues, a sleeve-shaped tripod head turnably seated on the upper end of the tubular extension post, means

2 for securing a camera to the top of the sleeve-shaped tripod head, a screw threading within the sleeve-shaped tripod head, an operating rod secured at one end to the conical expansion member and reaching with its other end into the sleeve-shaped tripod head, at least one axial slot in the upper end portion of the tubular extension post, and a moving member firmly secured to the other end of the operating rod and having at least one screw threaded extension passing through the axial slot in the upper end portion of the tubular extension post and engaging the screw threading in the sleeve-shaped tripod head, so that turning of the sleeve-shaped tripod head will result in sliding of the moving member in axial direction of the tubular extension post, causing movement of the conical expansion member in axial direction and consequent expansion of the expansion tongues which will frictionally engage the inner surface of the tubular central post, firmly securing the tubular extension post to the tubular central post in any desired position of sliding relative to the same.

A particularly preferred embodiment of my present invention comprises in combination a tubular central post, a sleeve member enclosing the tubular central post slidably along the same, a plurality or tripod legs each pivotally secured to the sleeve member, a plurality of elongated guiding members each pivoted at one end to one of the tripod legs spaced from the ends thereof and pivoted at its other end to the bottom portion of the tubular central post so as to be adapted to guide the legs between closed position with the sleeve member in uppermost position and the legs substantially parallel and adjacent to the tubular central post and supporting position with the sleeve member moved toward the bottom portion of the tubular central post and the legs in outwardly turned supporting position, manually operable locking means for locking the legs in closed position, whenever desired, manually releasable locking means for locking the legs in outwardly turned supporting position, spring means permanently tending to move the legs from closed into supporting position, a tubular extension post having an outer diameter being slightly smaller than the diameter of the tubular central post and arranged slidably within the tubular central post projecting upward beyond the upper end thereof, a plurality of expansion tongues formed at the lower end of the tubular extension post, a conical expansion member arranged within the tubular extension post at the lower end thereof engaging the expansion tongues, a sleeve-shaped tripod head turnably seated on the upper end of the tubular extension post, means for securing a camera to the top of the sleeve-shaped tripod head, a screw threading within the sleeve-shaped tripod head, an operating rod secured at one end to the conical expansion member and reaching with its other end into the sleeve-shaped tripod head, at least one axial slot in the upper end portion of the tubular extension post, and a moving member firmly secured to the other end of the operating rod and having at least one screw threaded extension passing through the axial slot in the upper end portion of the tubular extension post and engaging the screw threading in the sleeve-shaped tripod head, so that turning of the sleeve-shaped tripod head will result in sliding of the moving member in axial direction of the tubular extension post, causing movement of the conical expansion member in axial direction and consequent expansion of the expansion tongues which will frictionally engage the inner surface of the tubular central post, firmly securing the tubular extension post to the tubular central post in any desired position of sliding relative to the same.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side view of a tripod according to my present invention, in closed position;

Fig. 2 is a side view of my new tripod shown in Fig. 1, in operative position;

Fig. 3 is a longitudinal section through the upper part of the tripod shown in Figs. 1 and 2; and Fig. 4 is a cross section through the sleeve-shaped tripod head of the tripod shown in Fig. 3, along line 4—4 of Fig. 3.

The tripod as shown in the drawing includes a tubular central post 10 on which the slidable sleeve 11 and the stationary sleeve 12 are mounted as shown.

The tripod legs 13 are pivoted to slidable sleeve 11 at 14 and each of the elongated guiding rods 15 is pivoted at one end to stationary sleeve 12 as indicated by reference numeral 16, and at its other end to one of the legs 13, as indicated by reference numeral 17.

A spring 18 is provided as shown in Fig. 2 in order to automatically move the tripod legs from closed into supporting position whenever the locking means 19 detachably securing the slidable sleeve 11 to post 10, are released. The same locking means 19, which are preferably spring loaded, are adapted to engage the small hole 20 in post 10 and to firmly hold the legs 13 in operative position.

It should be stressed that the spring 18 instead of being arranged as shown, might be concealed within one or the other of the legs 13, or might be concealed within one or the other of the guiding members 15. Of course, it is also possible to use instead of a spring of the type shown a leaf spring, if desired.

The extension arrangement shown in Figs. 3 and 4 consists of a tubular extension post 21 arranged slidably within the tubular central post 10, as shown in Fig. 3. On the upper end of the extension post 21, the freely rotatable sleeve-shaped tripod head 22 is seated, which is closed at its upper end by disc 23 provided with the screw 24 for securing the camera to the tripod head.

The inner surface of the sleeve-shaped tripod head 22 is partly provided with a screw threading 25, as shown.

The lower end of the tubular extension post 21 is provided with slots 26 forming expansion tongues 27.

Within the lower end portion of post 21, the conical expansion member 28 is arranged as shown. This conical expansion member 28 is connected by means of the operating rod 29 with a moving member 30.

This moving member 30 is firmly secured to the upper end of the operating rod 29 and consists of a round disc-shaped portion 31 provided with two small extensions 32 which are screw threaded on their outer faces and engage with these screw threaded outer faces the screw threading 25 provided in the inner surface of the sleeve-shaped tripod head 32.

It should be stressed that the tubular extension post 21 is provided at its upper end with two slots 33 which correspond to the small extensions 32 of the moving member 30. As clearly shown in Fig. 4, the two extensions 32 pass through these slots 33, thereby preventing rotation of the moving member 30 relative to the tubular extension post 21; this causes axial movement of the member 30 during rotation of the sleeve-shaped tripod head 22.

The above described extension means are operated as follows:

If it is desired to move the tripod head 22 relative to the post 10, it is simply slid in axial direction. Such axial movement of the tripod head will result in axial movement of the extension post 21 which will be carried along by means of the expansion member 28.

The tripod head 22 can be held in any desired position simply by turning it in clockwise direction. Such turning will result in upward sliding of the moving member 30, causing upward movement of the expansion member 28; this, in turn, will force the tongues 27 outwards so as to frictionally engage the inner surface of the tubular central post 10, firmly holding the extension post 21 and the tripod head 22 in the desired position.

In order to release the tripod head 22, the same is simply turned in counter-clockwise direction which will result in downward movement of member 30, causing downward movement of the expansion member 28 and inward bending of the resilient tongues 27, eliminating friction between the same and the tubular central post 10.

It will be understood that each of the elements described above, or two or more together, may also find a useful application in tripods for other purposes, differing from the types described above.

While I have illustrated and described the invention as embodied in camera tripods, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A tripod comprising in combination a tubular central post; legs for supporting said tubular central post in upright position; a tubular extension post having an outer diameter being slightly smaller than the diameter of said tubular central post and arranged slidably within said tubular central post projecting upward beyond the upper end thereof; a plurality of expansion tongues formed at the lower end of said tubular extension post; a conical expansion member arranged within said tubular extension post at the lower end thereof engaging said expansion tongues; a sleeve-shaped tripod head turnably seated on the upper end of said tubular extension post; means for securing a camera to the top of said sleeve-shaped tripod head; and manually operable means combined with said sleeve-shaped tripod head for moving said conical expansion member in axial direction of said tubular extension post for forcing said expansion tongues at the lower end of said tubular extension post outward, whenever desired, so as to frictionally engage the inner surface of said tubular central post, thus firmly securing said tubular extension post to said tubular central post in any desired position of sliding relative to the same.

2. A tripod comprising in combination a tubular central post; legs for supporting said tubular central post in upright position; a tubular extension post having an outer diameter being slightly smaller than the diameter of said tubular central post and arranged slidably within said tubular central post projecting upward beyond the upper end thereof; a plurality of expansion tongues formed at the lower end of said tubular extension post; a conical expansion member arranged within said tubular extension post at the lower end thereof engaging said expansion tongues; a sleeve-shaped tripod head turnably seated on the upper end of said tubular extension post; means for securing a camera to the top of said sleeve-shaped tripod head; a screw threading within said sleeve-shaped tripod head; an operating rod secured at one end to said conical expansion member and reaching with its other end into said sleeve-shaped tripod head; a screw threaded moving member engaging said screw threading within said sleeve-shaped tripod head and firmly secured to the other end of said operating rod; and means preventing turning of said screw threaded moving member relative to said tubular extension post but permitting sliding of the same relative to said tubular extension post in axial direction thereof.

3. A tripod comprising in combination a tubular central post; legs for supporting said tubular central post in upright position; a tubular extension post having an outer diameter being slightly smaller than the diameter of said tubular central post and arranged slidably within said tubular central post projecting upward beyond the upper end thereof; a plurality of expansion tongues formed at the lower end of said tubular extension post; a conical expansion member arranged within said tubular extension post at the lower end thereof engaging said expansion tongues; a sleeve-shaped tripod head turnably seated on the upper end of said tubular extension post; means for securing a camera to the top of said sleeve-shaped tripod head; a screw threading within said sleeve-shaped tripod head; an operating rod secured at one end to said conical expansion member and reaching with its other end into said sleeve-shaped tripod head; at least one axial slot in the upper end portion of said tubular extension post; and a moving member firmly secured to the other end of said operating rod and having at least one screw threaded extension passing through said axial slot in the upper end portion of said tubular extension post and engaging said screw threading in said sleeve-shaped tripod head, so that turning of said sleeve-shaped tripod head will result in sliding of said moving member in axial direction of said tubular extension post, causing movement of said conical expansion member in axial direction and consequent expansion of said expansion tongues which will frictionally engage the inner surface of said tubular central post, firmly securing said tubular extension post to said tubular central post in any desired position of sliding relative to the same.

4. A tripod comprising in combination a tubular central post; a sleeve member enclosing said tubular central post slidably along the same; a plurality of tripod legs each pivotally secured to said sleeve member; a plurality of elongated guiding members each pivoted at one end to one of said tripod legs spaced from the ends thereof and pivoted at its other end to the bottom portion of said tubular central post so as to be adapted to guide said legs between closed position with said sleeve member in uppermost position and the legs substantially parallel and adjacent to said tubular central post and supporting position with said sleeve member moved toward the bottom portion of said tubular central post and said legs in outwardly turned supporting position; manually operable locking means for locking said legs in closed position, whenever desired; manually releasable locking means for locking said legs in outwardly turned supporting position; spring means permanently tending to move said legs from closed into supporting position; a tubular extension post having an outer diameter being slightly smaller than the diameter of said tubular central post and arranged slidably within said tubular central post projecting upward beyond the upper end thereof; a plurality of expansion tongues formed at the lower end of said tubular extension post; a conical expansion member arranged within said tubular extension post at the lower end thereof engaging said expansion tongues; a sleeve-shaped tripod head turnably seated on the upper end of said tubular extension post; means for securing a camera to the top of said sleeve-shaped tripod head; a screw threading within said sleeve-shaped tripod head; an operating rod secured at one end to said conical expansion member and reaching with its other end into said sleeve-shaped tripod head; at least one axial slot in the upper end portion of said tubular extension post; and a moving member firmly secured to the other end of said operating rod and having at least one screw threaded extension passing through said axial slot in the upper end portion of said tubular extension post and engaging said screw threading in said sleeve-shaped tripod head, so that turning of said sleeve-shaped tripod head will result in sliding of said moving member in axial direction of said tubular extension post, causing movement of said conical expansion member in axial direction and consequent expansion of said expansion tongues which will frictionally engage the inner surface of said tubular central post, firmly securing said tubular extension post to said tubular central post in any desired position of sliding relative to the same.

JACQUES BOLSEY.

REFERENCES CITED

The following references are of record in the file of this patent:

UNITED STATES PATENTS

| Number | Name | Date |
|---|---|---|
| 449,028 | Beilmann | Mar. 24, 1891 |
| 614,944 | Gaylor | Nov. 29, 1898 |
| 641,895 | Scovill | Jan. 23, 1900 |
| 744,386 | Norton | Nov. 17, 1903 |
| 880,394 | Nicolai | Feb. 25, 1908 |
| 1,175,352 | Hand | Mar. 14, 1916 |
| 1,428,601 | McGurkin | Sept. 12, 1922 |
| 1,652,079 | Westerman | Dec. 6, 1927 |
| 1,844,113 | Beidler et al. | Feb. 9, 1932 |
| 1,863,442 | Goodman | June 14, 1932 |
| 2,272,490 | Waechter | Feb. 10, 1942 |
| 2,303,978 | Biberman | Dec. 1, 1942 |
| 2,490,369 | Neuwirth | Dec. 6, 1949 |
| 2,510,412 | Olson | June 6, 1950 |
| 2,549,584 | Eller | Apr. 17, 1951 |